US009240027B2

(12) United States Patent
Kiet et al.

(10) Patent No.: US 9,240,027 B2
(45) Date of Patent: Jan. 19, 2016

(54) SYSTEMS AND METHODS FOR ESTABLISHING COMMUNICATION BETWEEN AN INTERPRETER AND A SERVICE RECIPIENT

(71) Applicant: Gold Post Technologies, Inc., Las Vegas, NV (US)

(72) Inventors: Quyen Kiet, Las Vegas, NV (US); Uttam Shah, Irvine, CA (US); Barry Goldstein, Las Vegas, NV (US)

( * ) Notice: Subject to any disclaimer, the term of this patent is extended or adjusted under 35 U.S.C. 154(b) by 0 days.

(21) Appl. No.: 14/486,977

(22) Filed: Sep. 15, 2014

(65) Prior Publication Data
US 2015/0077507 A1    Mar. 19, 2015

Related U.S. Application Data

(60) Provisional application No. 61/877,687, filed on Sep. 13, 2013.

(51) Int. Cl.
*H04N 7/14* (2006.01)
*G06Q 40/08* (2012.01)
*G06Q 10/06* (2012.01)

(52) U.S. Cl.
CPC ........ *G06Q 40/08* (2013.01); *G06Q 10/063112* (2013.01)

(58) Field of Classification Search
CPC ....................................................... H04N 7/14
USPC ................................. 348/14.01, 14.08; 704/2
See application file for complete search history.

(56) References Cited

U.S. PATENT DOCUMENTS 8,817,966 B2 *    8/2014    Wrench ............... G06Q 10/101
                                                                348/14.08

* cited by examiner

*Primary Examiner* — Olisa Anwah
(74) *Attorney, Agent, or Firm* — Next IP Law Group LLC; Minh N. Nguyen, Esq.

(57) ABSTRACT

A representative a scheduler and telecommunication provider manager has instructions that are stored in memory and executed by a processing device. The instructions includes the logics of receiving a request for a date, time, and an availability of an interpreter having at least one language interpretation to schedule a interpretation service assignment from the plurality of computing devices associated with the at least one service recipient; receiving authorization of a interpretation service assignment from the plurality of computing devices associated with the at least one insurance carrier based on the requested date, time, and availability of the interpreter; responsive to receiving the authorization of the interpretation service assignment, scheduling the interpretation service assignment based on the requested date, time, and the availability of the interpreter; determining whether to activate a telecommunication connection between the plurality of the computing devices associated with the interpreter and service recipient based on the requested date, time, and the availability of the interpreter; and responsive to determining that the telecommunication connection is activated, establishing the telecommunication connection between the plurality of the computing devices associated with the interpreter and service recipient by way of the scheduler and telecommunication provider server.

11 Claims, 9 Drawing Sheets

SYSTEMS AND METHODS FOR ESTABLISHING COMMUNICATION BETWEEN AN INTERPRETER AND A SERVICE RECIPIENT

CROSS REFERENCE TO RELATED APPLICATIONS

This application claims the benefit of U.S. provisional application entitled, "System For and Method of Remote Video Interpreter Scheduling when there is a Third Party Payer," having Ser. No. 61/877,687, filed on Sep. 13, 2013, all of which are entirely incorporated herein by reference.

TECHNICAL FIELD

The present disclosure is generally related to telecommunication systems and, more particularly, is related to systems and methods for establishing communication between an interpreter and a service recipient.

BACKGROUND

There are many challenges when operating a live video streaming platform for language interpreting agencies, their clients and their users due to the various roles of each one. This invention specifically addresses the insurance carrier model (third party payer) that can first approve the interpretation service prior to the interpretation service provider delivering the interpreting service to the remote service recipient. Normally, the service recipient initiates the request for interpreting service directly with the interpreting provider, agreeing to render payment in return for the interpretation service. This one-to-one two party negotiation is direct and simple, and can be easily delivered with an "on demand" video remote interpretation platform whereby the service recipient clicks a button requesting the interpreting service and in response the interpretation provider connects the service recipient to the interpreter. Implicit in this request is the understanding the service recipient is responsible for payment to the interpreting service provider.

Desirable in the industry is to improve on the conventional deliverance of the interpretation service.

SUMMARY

A representative scheduler and telecommunication provider manager has instructions that are stored in memory and executed by a processing device. The instructions includes the logics of receiving a request for a date, time, and an availability of an interpreter having at least one language interpretation to schedule a interpretation service assignment from the plurality of computing devices associated with the at least one service recipient; receiving authorization of a interpretation service assignment from the plurality of computing devices associated with the at least one insurance carrier; responsive to receiving the authorization of the interpretation service assignment, scheduling the interpretation service assignment based on the requested date, time, and the availability of the interpreter; determining whether to activate a telecommunication connection between the plurality of the computing devices associated with the interpreter and service recipient based on the requested date, time, and the availability of the interpreter; and responsive to determining that the telecommunication connection is activated, establishing the telecommunication connection between the plurality of the computing devices associated with the interpreter and service recipient by way of the scheduler and telecommunication provider server.

Other systems, devices, methods, features of the invention will be or will become apparent to one skilled in the art upon examination of the following figures and detailed description. It is intended that all such systems, devices, methods, features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which telecommunication can be established between an interpreter and a service recipient based on an authorization of an insurance carrier. In an example related to worker compensation claims where the interpreting service is paid for not by the service recipient, but by a third party like the insurance carrier, the service recipient and/or the insurance carrier can initiate the service. However, it is the carrier that agrees to render payment to the interpreting service provider. Because the onsite service recipient is not the one responsible for payment, any scheduling technology should eliminate the unilateral ability of the service recipient to initiate the service request that has not yet been approved for payment by the third party payer. Thus, any technology that facilitates the scheduling of said remote video interpretation services should take this three party ecosystem into account—this invention does just that and will be referred to as "Tricycle" henceforth in this application. Tricycle specifically refers to the system for and method of initiating and scheduling remote interpreters between three parties: (1) the carrier, who approves of the interpreting service, (2) the interpreting agency, who schedules and connects interpreters remotely by, for example, internet video streaming, and (3) the service recipient, who receives the interpreting service on the other end of the interpreter's video connection.

Figure 1:
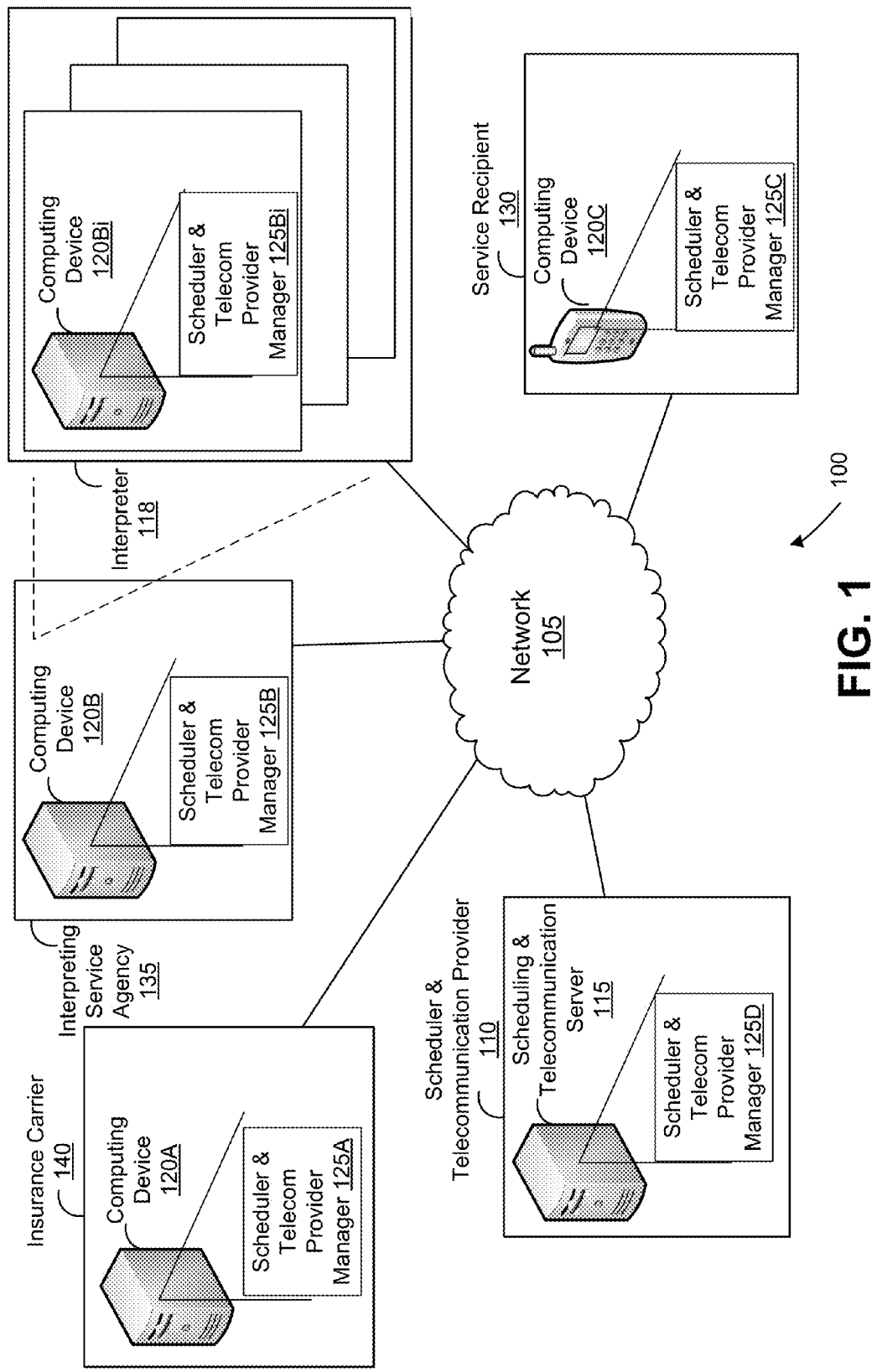
FIG. 1 is a block diagram that illustrates an embodiment of a system having a scheduler and telecommunication provider manager that facilitates a establishing a telecommunication connection between an interpreter and a service recipient via a network.

FIG. 1 is a block diagram that illustrates an embodiment of a system 100 having a scheduler and telecommunication provider manager 125 that facilitates a establishing a telecommunication connection between an interpreter 118 and a service recipient 130 via a network 105. The system 100 can include scheduling and telecommunication provider server 115 at a premise of a scheduler and telecommunication provider 110, and computing devices 120A-C associated with an insurance carrier 140, an interpret service agency 135, an interpreter 118 and a service recipient 130. The computing devices 120A-C can include, but not limited to, desktop computers, laptops, netbooks, smart phones, tablets, smart glasses (such as Google Glass™), and smart watches.

Each scheduling and telecommunication provider server 115 and computing devices 120A-C is installed with a scheduler and telecommunication provider manager 125A-D. The computing devices 120A-C can communication with the scheduling and telecommunication provider server 115 via the network 105, e.g., Internet, LAN, and WAN. The scheduler and telecommunication provider manager 125 can aide a service recipient 130 to establish a telecommunication connection (e.g., voice and/or video connection) with an interpreter 118. The scheduler and telecommunication provider manager 125 is further described in connection to the later FIGS. The service recipient can use his/her computing device (s) 120C or use a service facility's computing device (not shown) at a doctor's office, court room, government department of labor, and other facilities having a network connection.

Figure 2:
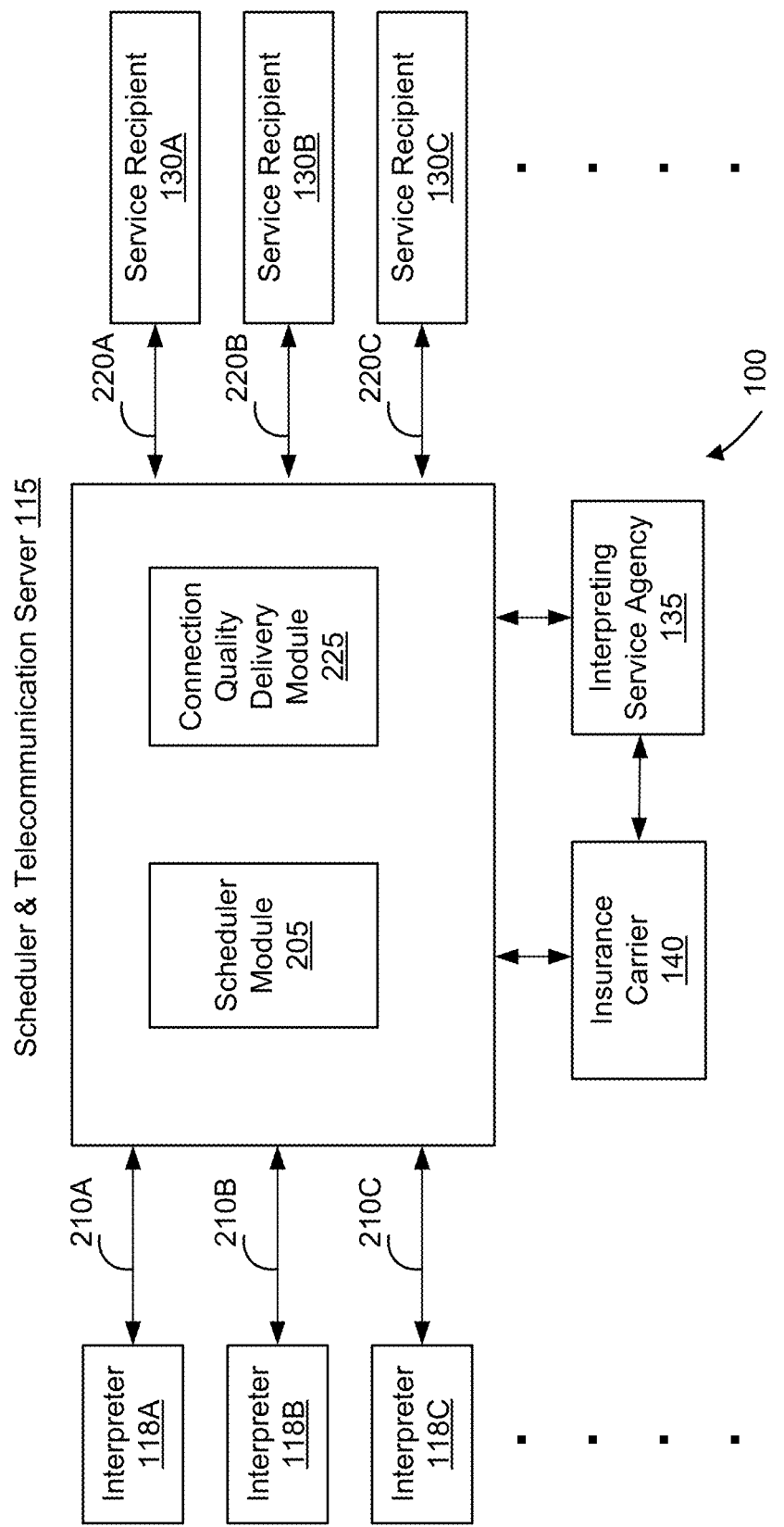
FIG. 2 is a high-level block diagram that illustrates an embodiment of a telecommunication system, such as that shown in FIG. 1.

FIG. 2 is a high-level block diagram that illustrates an embodiment of a telecommunication system 100, such as that shown in FIG. 1. A plurality of interpreters 118A-C and a plurality of service recipients 130A-C can communicate with the scheduler and telecommunication server 115 via lines 210A-C, 220A-B, respectively, through their respective computing devices 120A-C, such as smartphones (e.g. iPhone devices, Android devices, Windows Mobile), personal computers or hand held tablet devices (e.g. iPad, Galaxy Note, Microsoft Surface, etc.) or networking clients (e.g. Ethernet LAN), for example. The computing devices 120A-C can communicate with the scheduler and telecommunication server 115 by Internet connection (e.g. TCP/IP framework) or private network (e.g. Ethernet LAN or wireless LAN), for example.

Each computing device 120 has functional modules (Interface Device, I/O Device, Network Device, Processing Device, etc.) that enable the user to communicate with the scheduler and telecommunication server 115. On their respective computing devices 120, each service recipient 130 request for an interpreter 118 and selects the language of choice based on their unique needs (e.g. Spanish Legal, Spanish Medical, etc.) by interacting with their computing device 120C, which is transmitted to the scheduler and telecommunication server 115 for processing by a scheduler module 205 and connection quality delivery module 225, which are described in more detailed in connection to the later FIGS.

The service recipients 130A-C who need language interpretation services would register with the scheduler and telecommunication server 115, and provide information related to their insurance carrier that insures the service recipients with interpretation services. Insurance carriers 140 can register with the scheduler and telecommunication server 115 and provide information related to the interpret service agency(ies) 135 that are interpretation vendors of the insurance carriers 140. Interpret service agency 135 can registers with the scheduler and telecommunication server 115 and provide payment information to compensate the scheduler and telecommunication provider 110. Interpreters 118A-C who wish to provide language interpretation services can register with scheduler and telecommunication server 115 and/or with the interpret service agency 135.

After the service recipients 130 and interpreters 118A-C have registered with scheduler and telecommunication server 115, they can have access to the various interface portals on numerous devices (such as desktop PC browser, website, native smartphone app, tablet app, in-car network like OnStar™). Because the interpret service agency 135 have already pre-arranged the service pricing and payment process ahead of time with the $3^{rd}$ party payer (e.g., insurance carriers), there is no need for the interpreting service agency 135 to negotiate pricing or payment with the service recipient. Similarly, because registered interpreters 118A-C have already pre-arranged their compensation and payment procedure with the interpreters' service agency, there is no need for interpreters 118A-C to worry about payment terms when accepting a service request.

Alternatively or additionally, the interpreting service agency 135 may have already retained interpreters 118A-C without the aid of the scheduler and telecommunication provider 110 and does not need to seek for an interpreter. Hence, the interpreting service agency 135 may use the telecommunication system 100 to schedule and deliver a voice and/or video telecommunication between the service recipient 130 and its interpreter 118.

Figure 3:
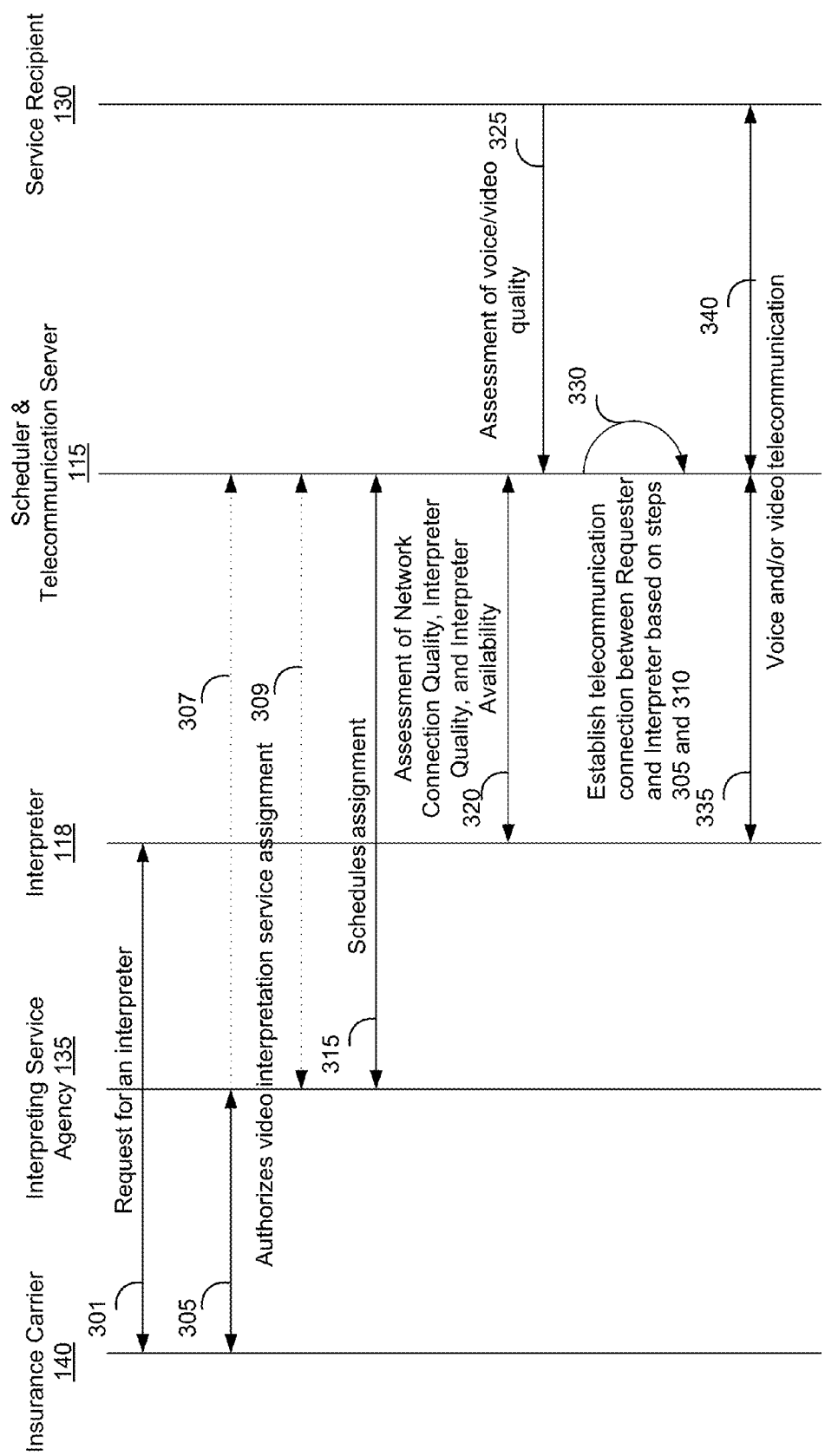
FIG. 3 is a sequence diagram that illustrates an embodiment of a telecommunication system, such as that shown in FIG. 2.

FIG. 3 is a sequence diagram that illustrates an embodiment of a telecommunication system 100, such as that shown in FIG. 2. In an example, when the service recipient 130 seeks Spanish interpretation service, the service recipient 130 at line 301 can access the smartphone app having the scheduler and telecommunication provider manager 125C and request his/her insurance carrier 140 for a Spanish-English interpreter 118 for a delivery of service on a date and time. The request can include a date, time, availability of an interpreter having at least one language interpretation, claims number, insured information, location, interpreter, and venue. The insurance carrier 140 receives the request by the computing device 120A associated with the insurance carrier 140, which processes the request to determine whether to authorize a voice and/or video interpretation service assignment based on the purchased insurance policy of the service recipient 130. Alternatively, the insurance carrier may initiate the request for service directly to the interpreting agency at 305.

If the insurance carrier 140 authorizes the request (or initiates the request), the insurance carrier 140 transmits an authorization related to the voice and/or voice interpretation service assignment. The interpret service agency 135 receives the authorization of the voice and/or video interpretation service assignment by the computing device 120B associated with the interpret service agency 135. The insurance carrier 140 can communicate the authorization directly at line 305 to the interpret service agency 135 or indirectly at lines 307, 309 by way of the scheduler and telecommunication server 115. Direct authorization at line 305 may also include a phone call to the interpreting agency, or electronic communication like Email.

The interpret service agency 135 communicates at line 315 with the scheduler and telecommunication server 115 to schedule the voice and/or video interpretation service assignment based on the requested date, time, and the availability of the interpreter 118. The scheduler and telecommunication server 115 can assess at line 320 the quality and availability of the interpreter, and the connection quality of a voice/video teleconference with the interpreter 118, and can assess at line 325 the connection quality of voice/video teleconference with the service recipient 130.

The scheduler and telecommunication server 115 at line 330 establishes the telecommunication connection for the interpretation service assignment between the plurality of the computing devices 120Bi, 120C associated with the interpreter 118 and service recipient 130 by way of the scheduler and telecommunication provider server 115. The interpreter 118 and the service recipient 130 connect at lines 335, 340 with each other in a voice and/or video telecommunication, such as video conferencing, by way of the scheduler and telecommunication server 115. After the interpretation service is completed, the scheduler and telecommunication server processes a financial transaction associated with the voice and/or video telecommunication by using the financial information from the insurance company and/or interpreting service agency.

Figure 4:
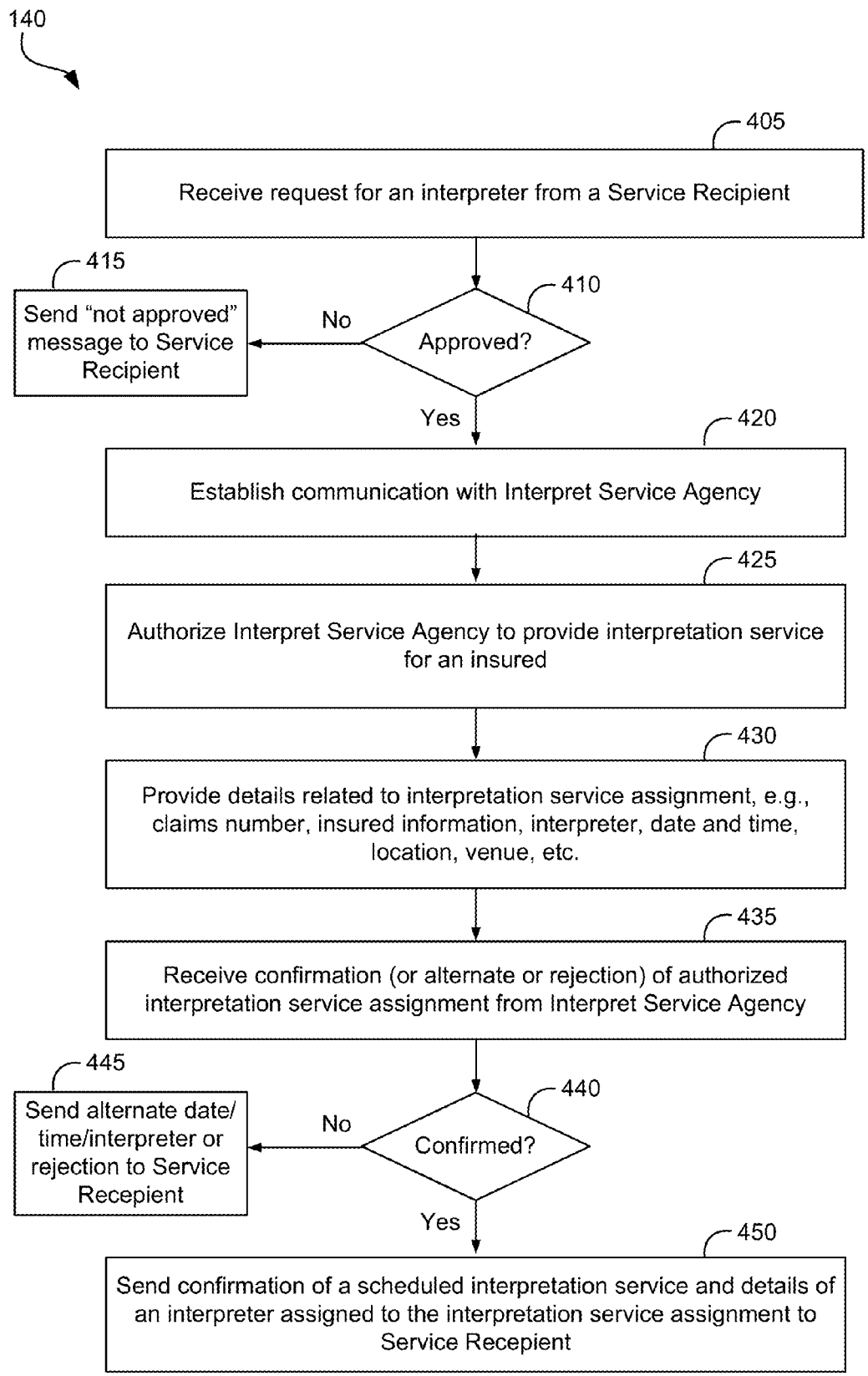
FIG. 4 is a flow diagram that illustrates an embodiment of the architecture, functionality, and/or operation of a scheduler and telecommunication provider manager executed on a computing device associated with an insurance carrier, such as that shown in FIG. 1.

FIG. 4 is a flow diagram that illustrates an embodiment of the architecture, functionality, and/or operation of a scheduler and telecommunication provider manager 125A executed on a computing device 120A associated with an insurance carrier 140, such as that shown in FIG. 1. Beginning with block 405, the insurance carrier 140 receives a request for an interpreter 118 from a service recipient 130 (or may themselves initiate the service request on behalf of the recipient). The request includes, but is not limited to, a date, time, availability of the interpreter, interpreter, location, and venue. The insurance carrier 140 determines at block 410 whether to approve the request based on the purchased insurance policy of the service recipient 130; if the insurance carrier 140 initiated the request on behalf of the Service Recipient, then that request can be assumed to be approved.

Responsive to the insurance carrier 140 not approving the request, the insurance carrier 140 at block 415 sends a "not approved" message to the service recipient 130. Responsive to the insurance carrier 140 approving the request, the insurance carrier 140 at block 420 establishes communication with the interpret service agency 135. At blocks 425, 430, the insurance carrier 140 authorizes the interpret service agency to provide interpretation service for the service recipient, e.g., an insured, and provide details related to the interpretation service assignment, such as, claims number, insured information, date, time, availability of the interpreter, interpreter, location, and venue.

The insurance carrier 140 receives at block 435 a confirmation (or alternate or rejection) of the authorized interpretation service assignment from the interpret service agency 135. At block 440, the insurance carrier 140 determines whether it has receive a confirmation, alternate, and rejection of the authorized interpretation service assignment from the interpret service agency 135. At block 445, responsive to not receiving the authorization of the video interpretation service assignment, the insurance carrier 140 sends a rejection message and/or an alternate schedule for the video interpretation service assignment based on the requested date, time, and the availability of the interpreter. Responsive to receiving the authorization of the video interpretation service assignment, the insurance carrier 140 at block 450 sends a confirmation of the scheduled interpretation service and details of an interpreter assigned to the interpretation service assignment.

Figure 5:
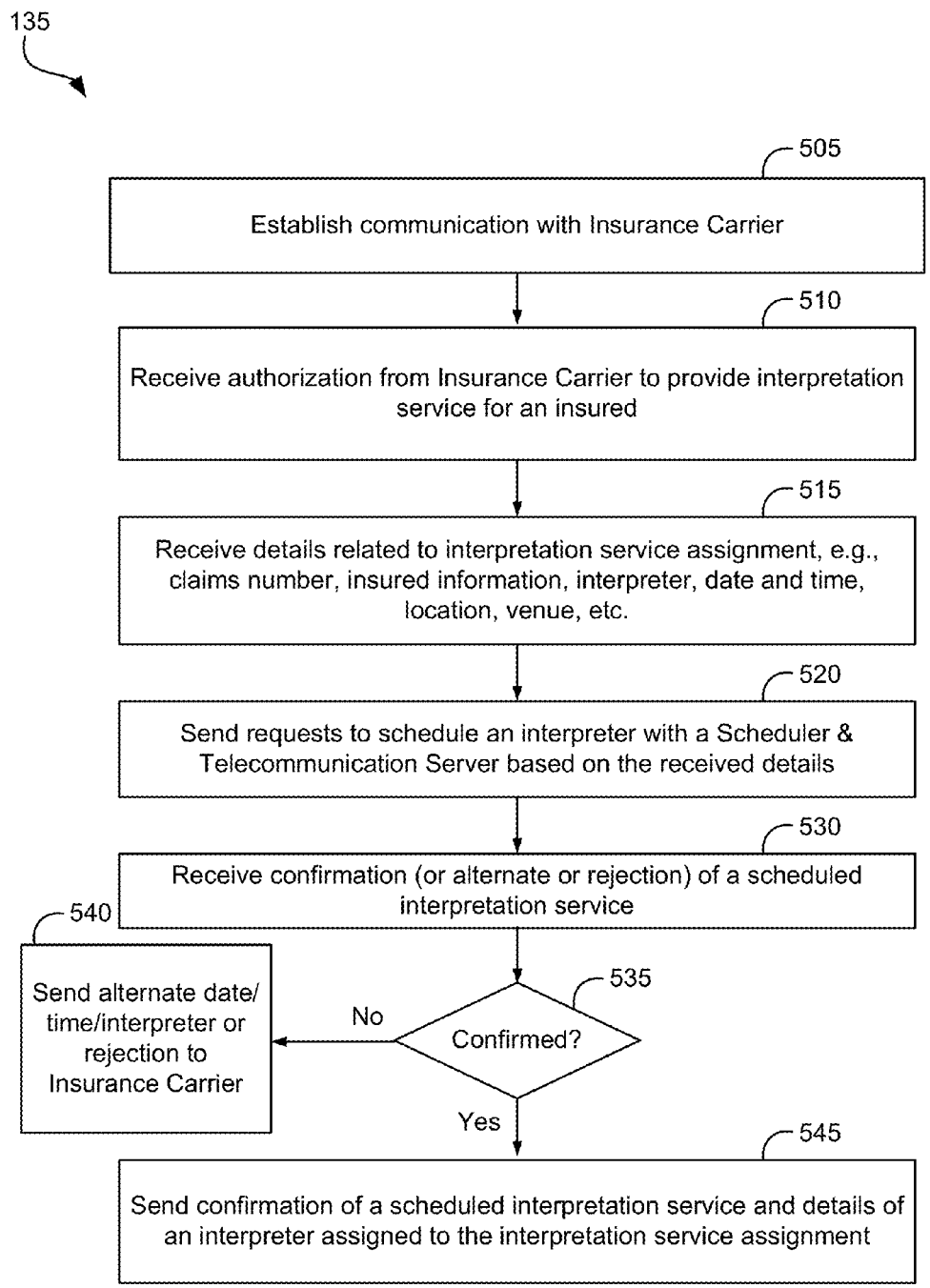
FIG. 5 is a flow diagram that illustrates an embodiment of the architecture, functionality, and/or operation of a scheduler and telecommunication provider manager executed on a computing device associated with an interpret service agency, such as that shown in FIG. 1.

FIG. 5 is a flow diagram that illustrates an embodiment of the architecture, functionality, and/or operation of a scheduler and telecommunication provider manager 125B executed on a computing device 120B associated with an interpret service agency 135, such as that shown in FIG. 1. At block 505, the interpret service agency 135 establishes communication with the insurance carrier 140. At blocks 510, 515, the interpret service agency 135 receives an authorization from the insurance carrier 140 to provide an interpretation service for the service recipient, e.g., an insured, and details related to the interpretation service assignment, e.g., claims number, insured information, interpreter, date, time, location, venue, etc.

At block 520, the interpret service agency 135 sends at least one request to at least one interpreter 118 to schedule a telecommunication connection, e.g., video conferencing, based on the received details from the insurance carrier 140. The interpret service agency 135 receives at block 530 a confirmation (or alternate or rejection) from the interpreter 118 for a scheduled interpretation service. At block 535, the interpret service agency 135 determines whether the interpreter 118 confirms the scheduled interpretation service.

At block 540, responsive to not receiving the confirmation of the scheduled interpretation service, the interpret service agency 135 sends a rejection message and/or an alternate date/time/interpreter to the insurance carrier 140 for scheduled interpretation service based on the requested date, time, and the availability of the interpreter. Responsive to receiving the confirmation of the scheduled interpretation service, the interpret service agency 135 at block 545 sends a confirmation of the scheduled interpretation service and details of an interpreter assigned to the interpretation service assignment.

Figure 6:
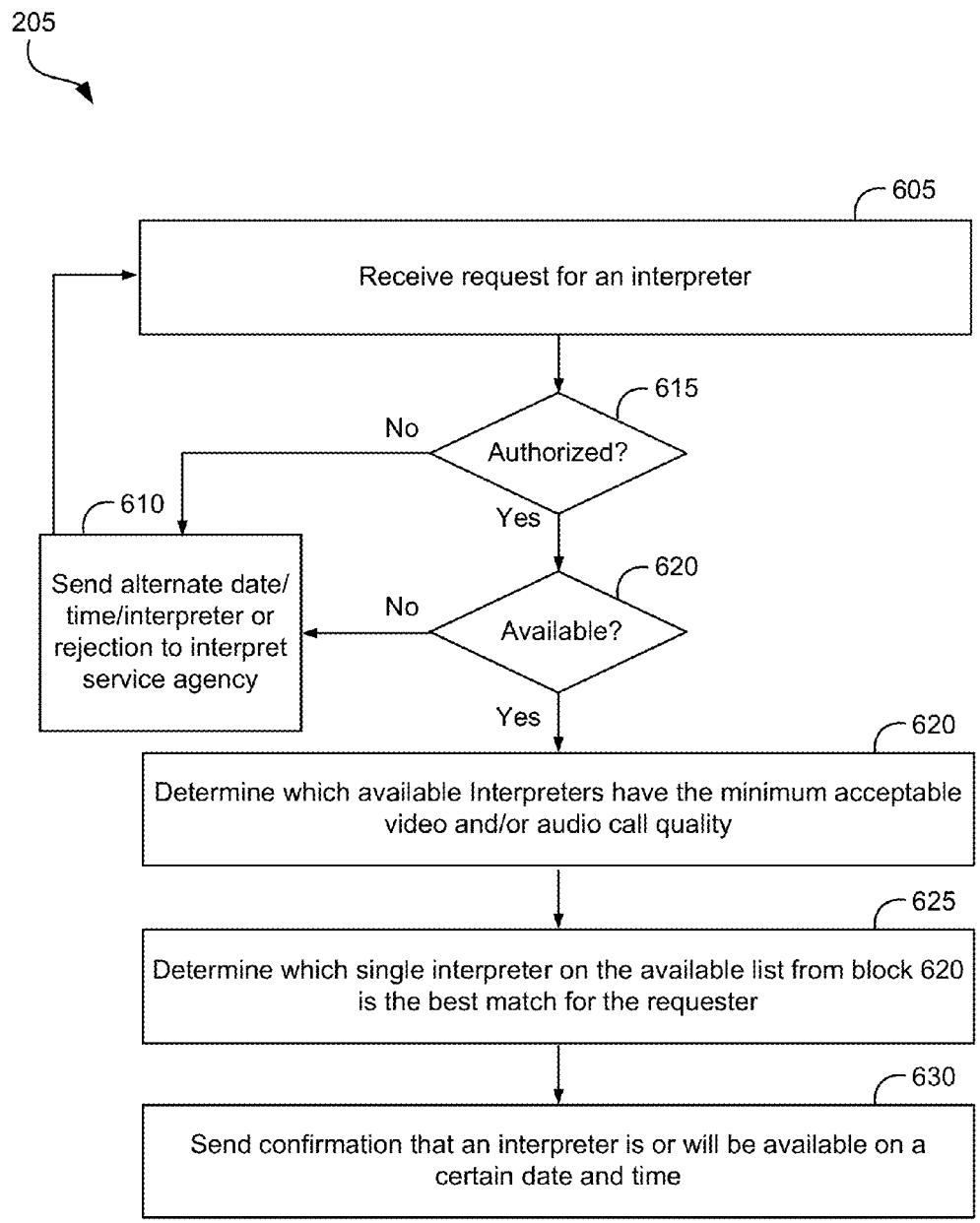
FIG. 6 is a flow diagram that illustrates an embodiment of the architecture, functionality, and/or operation of a scheduler module, such as that shown in FIG. 2.

FIG. 6 is a flow diagram that illustrates an embodiment of the architecture, functionality, and/or operation of a scheduler module 205, such as that shown in FIG. 2. Beginning with block 605, the scheduler module 205 receives a request from an interpreter 118 at the computing device 120 associated with either the insurance carrier 140 or scheduling and telecommunication provider server 115, or both. At block 615, the scheduler module 205 determines whether the request for the interpretation service is authorized by the insurance carrier 140. At block 620, responsive to determining that the insurance carrier 140 authorized the request, the scheduler module 205 determines whether an interpreter 118 is available based on the request.

Responsive to determining that the insurance carrier 140 did not authorize the request or the interpreter 118 is not or will not be available based on the request, the scheduler module 205 at block 610 sends a rejection message and/or an alternate date/time/interpreter to the insurance carrier 140 for scheduled interpretation service based on the requested date, time, and the availability of the interpreter 118. If there are interpreters 118 who are "available", the scheduler module 205 at block 615 determines which available interpreters 118 have the minimum acceptable video and/or audio call quality. The scheduler module 205 ranks the interpreters in a list based on the acceptable video and/or audio call quality, and filters and selects the interpreters who exceed the minimum acceptable call quality.

At block 625, from the list provided in block 620, the scheduler module 205 determines which single interpreter 118 on the available list from block 620 is the best match for the requester 130. The scheduler module 205 sends a confirmation that an interpreter is or will be available on a certain date and time. establishes telecommunication connection between the selected interpreter 118 and the requester 130.

Figure 7:
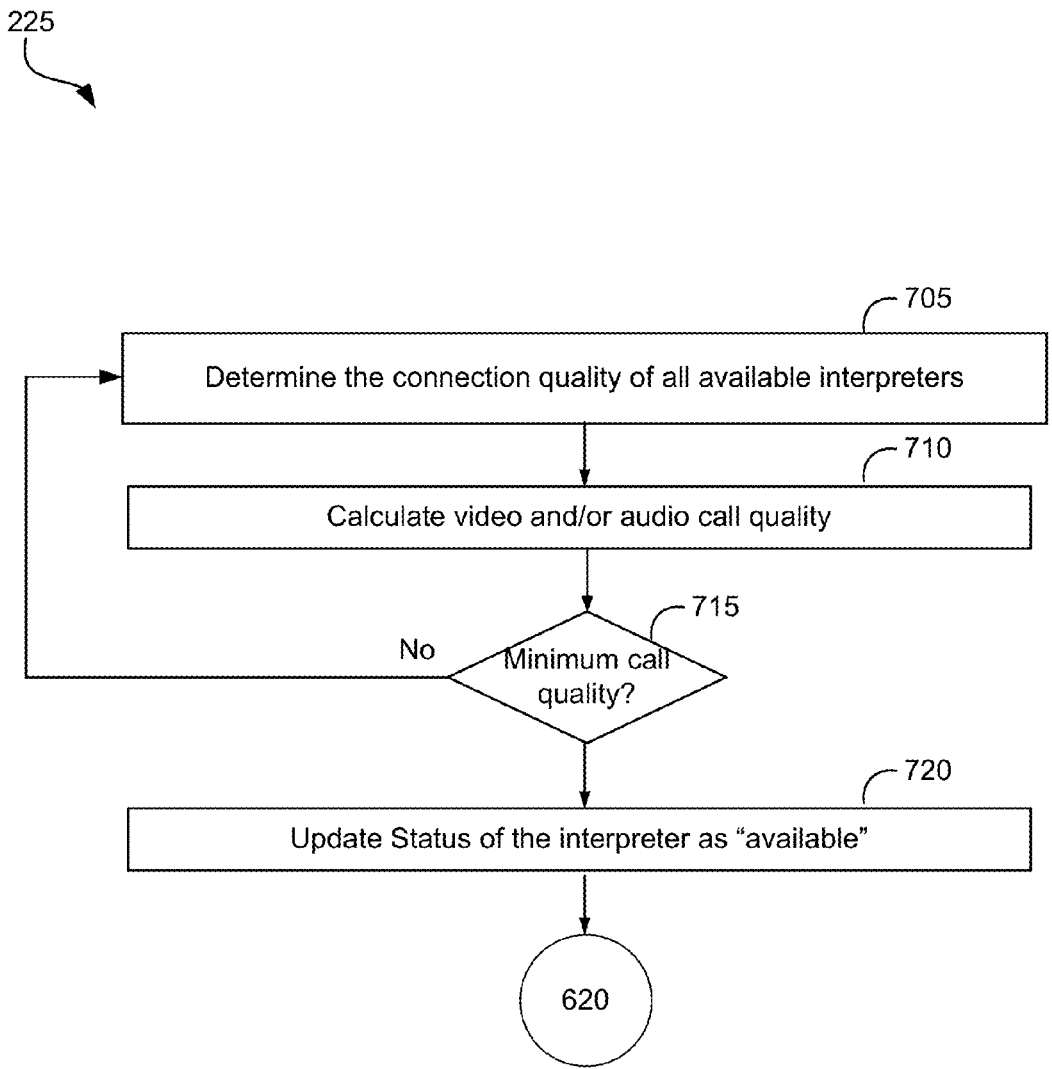
FIG. 7 is a flow diagram that illustrates an embodiment of the architecture, functionality, and/or operation of a connection quality delivery module, such as that shown in FIG. 2.

FIG. 7 is a flow diagram that illustrates an embodiment of the architecture, functionality, and/or operation of a connection quality delivery module 225, such as that shown in FIG. 2. At block 705, the connection quality delivery module 225 determines the connection quality of all "active" (available and unavailable) interpreters 118 and assigns it a score. There is a specified minimum acceptable video and/or audio call quality score that is predetermined by the system administrator against which the interpreter telecommunication connection scores are compared.

At block 710, the module 225 receives the connection request from interpreters 118 (FIG. 2, 210A, 210B, etc.), and before connecting the interpreters 118 with the service recipient 130, the module 225 calculates their respective video and/or audio call quality by determining the average bit rate and/or connection speed between each interpreter 118 and the match server 115. At block 715, the connection quality is available for evaluation when the interpreter 118 establishes connection with the scheduler and telecommunication server 115 via the Internet. If the call quality is below the minimum acceptable score, the scheduler and telecommunication server 115 communicates to the interpreter 118 that no connection can be made until the interpreter 118 improves the connection quality.

The interpreter 118 who is denied connection due to low quality may attempt to reconnect until the scheduler and telecommunication server 115 determines that the call quality of the interpreter 118 is acceptable. Responsive to the interpreter connection score exceeding the minimum quality connection score, the scheduler and telecommunication server 115 at block 720 updates the status of the interpreter 118 having at least the minimum call quality score as "available", and then ranks them from best to worst based on their relative score. The updates and rank are transmitted to the schedule module 205 at block 620.

Figure 8:
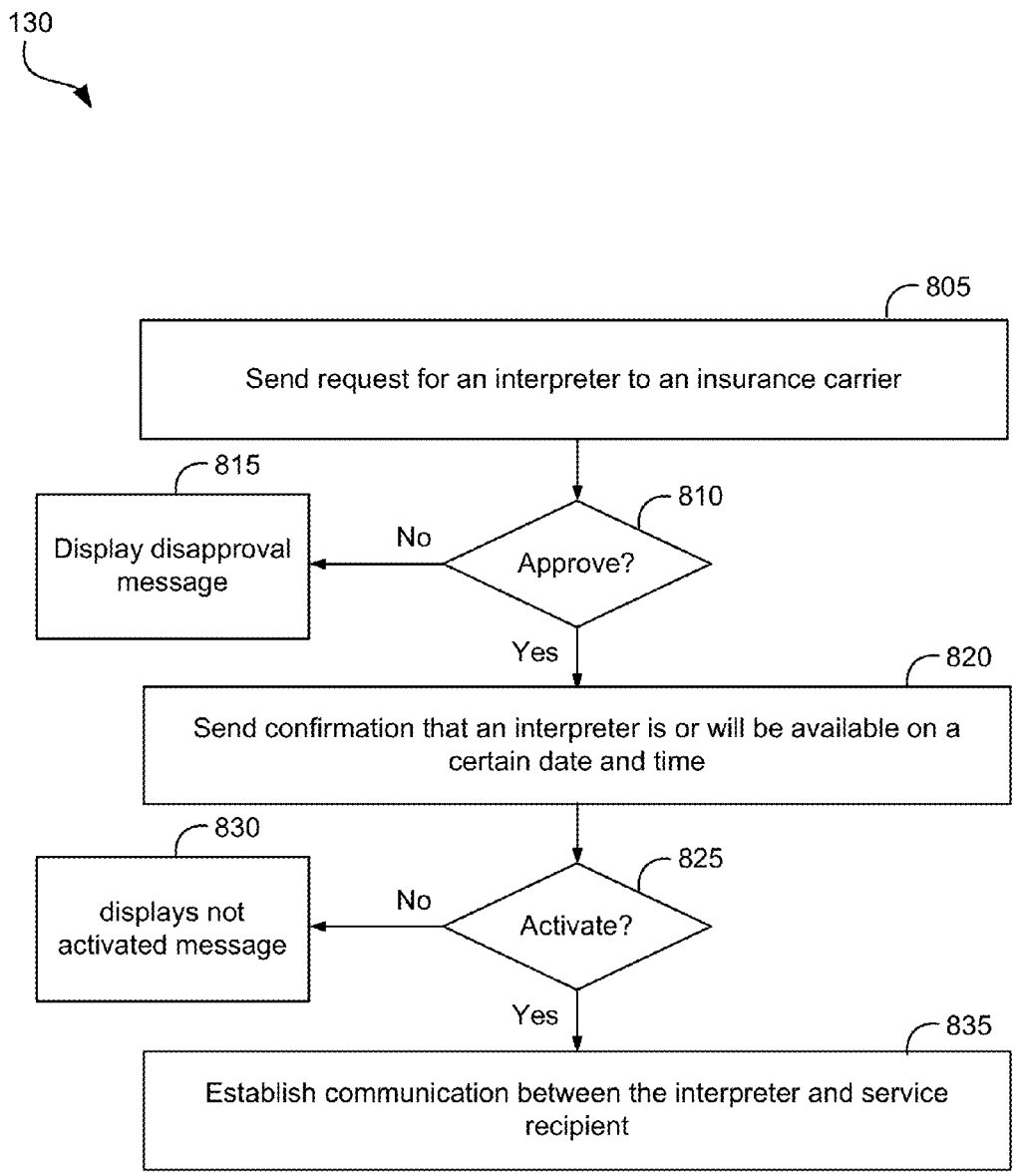
FIG. 8 is a flow diagram that illustrates an embodiment of the architecture, functionality, and/or operation of a scheduler and telecommunication provider manager executed on a computing device associated with a service recipient, such as that shown in FIG. 1.

FIG. 8 is a flow diagram that illustrates an embodiment of the architecture, functionality, and/or operation of a scheduler and telecommunication provider manager 125C executed on a computing device 120C associated with a service recipient 130, such as that shown in FIG. 1. Beginning with the block 805, the service recipient 130 sends a request for an interpreter 118 to an insurance carrier 140. The scheduler and telecommunication provider manager 125C at block 810 determines whether the insurance carrier 140 approves of the request for the interpretation service from the service recipient 130.

Responsive to receiving no approval from the insurance carrier 140, the scheduler and telecommunication provider manager 125C at block 815 displays a disapproval message.

Responsive to receiving an approval from the insurance carrier 140, the scheduler and telecommunication provider manager 125C at block 820 sends a confirmation that an interpreter 118 is or will be available on a certain date and time. The scheduler and telecommunication provider manager 125C at block 825 determines whether to activate the interpretation service based on the confirmation for the interpretation service requested by the service recipient 130. The determination for activation includes comparing the current date and time with the scheduled date and time. The determination process can also include receiving the claims number and name of the insurance company from the service recipient and comparing the received claims number with the stored claims number and the name of the insurance company associated with the confirmation.

Responsive to determining that the interpretation service is not activated, the scheduler and telecommunication provider manager 125C at block 830 displays a not activated message. Responsive to determining that the interpretation service is activated, the scheduler and telecommunication provider manager 125C at block 835 establishes a telecommunication connection, e.g., video conferencing, between the interpreter 118 and the service recipient 130.

Figure 9:
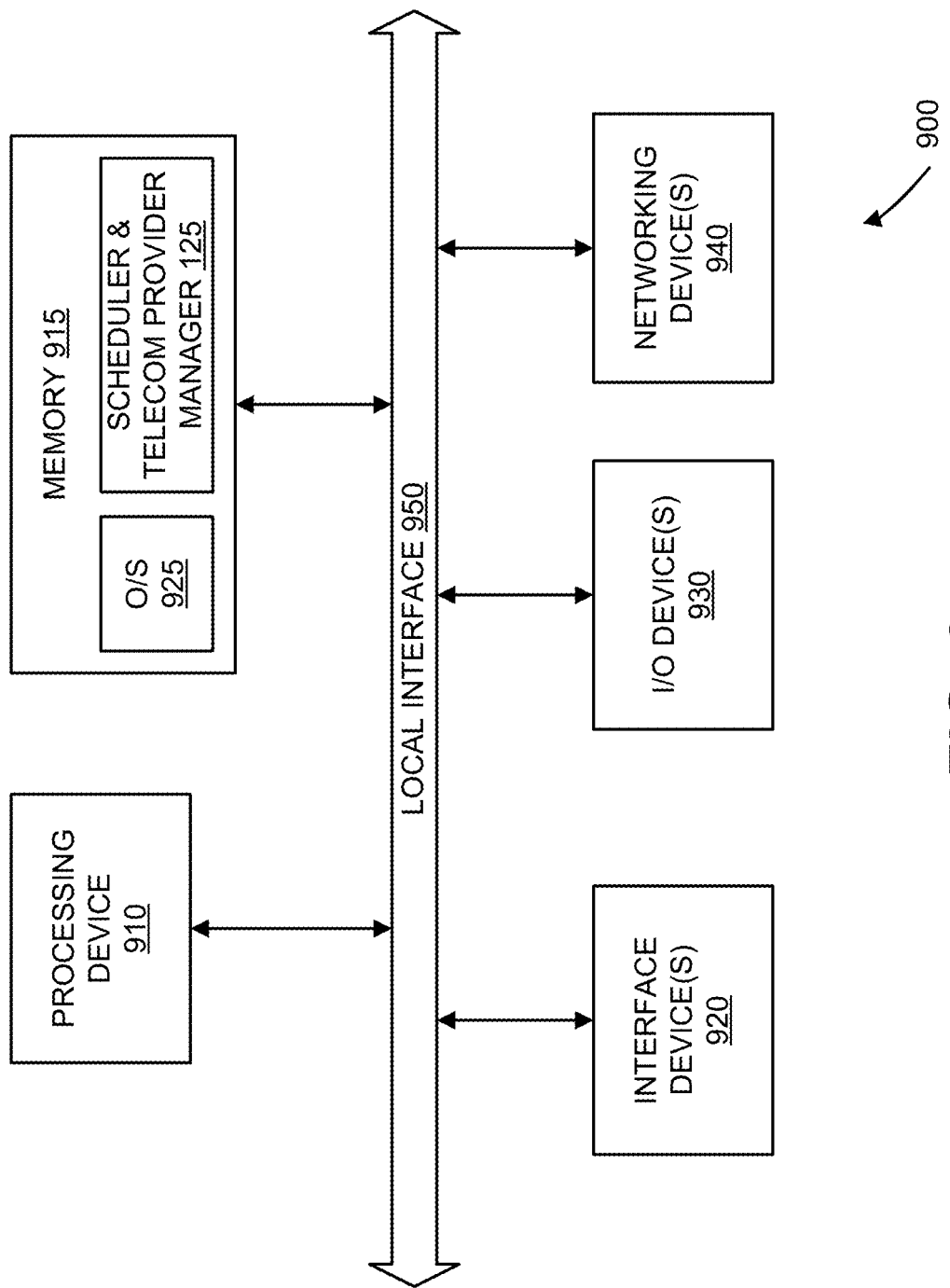
FIG. 9 is a block diagram illustrating an exemplary architecture for a generic computer that is similar to the architecture of the computing device, local server and central server having a scheduler and telecommunication provider manager, such as that shown in FIG. 1.

FIG. 9 is a block diagram illustrating an exemplary architecture for a generic computer that is similar to the architecture of the computing device, local server and central server having a scheduler and telecommunication provider manager 125, such as that shown in FIG. 1. As indicated in FIG. 9, the computing generic computer 900 comprises a processing device 910, memory 915, one or more user interface devices 920, one or more I/O devices 930, and one or more networking devices 940, each of which is connected to a local interface 950. The processing device 910 can include any custom made or commercially available processor, a central processing unit (CPU) or an auxiliary processor among several processors associated with the generic computer 900, a semiconductor based microprocessor (in the form of a microchip), or a macroprocessor. The memory 915 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 920 comprise those components with which the user (e.g., administrator) can interact with the generic computer 900. Where the generic computer 900 comprises a server computer or similar device, these components can comprise those typically used in conjunction with a PC such as a keyboard and mouse.

The one or more I/O devices 930 comprise components used to facilitate connection of the generic computer 900 to other devices and therefore, for instance, comprise one or more serial, parallel, small system interface (SCSI), universal serial bus (USB), or IEEE 1394 (e.g., Firewire™) connection elements. The networking devices 940 comprise the various components used to transmit and/or receive data over network 105, where provided. By way of example, the networking devices 940 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 915 normally comprises various programs (in software and/or firmware) including an operating system (O/S) 925. The O/S 925 controls the execution of programs, and provides scheduling, input-output control, file and data management, memory management, and communication control and related services.

The systems and methods disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A telecommunication system that establishes communication between an interpreter and a service recipient comprising:
   a plurality of computing devices associated with at least one interpreter, at least one service recipient, at least one interpret service agency, and at least one insurance carrier;
   a network that interconnects the plurality of computing devices; and
   a scheduler and telecommunication server that is interconnected to the plurality of computing devices by way of a network, wherein the scheduler and telecommunication server and at least one of the plurality of computing devices each includes a processing device; and memory including a scheduler and telecommunication provider manager which has instructions that are executed by the processing device, the instructions including the following logics:
      receive a request for a date, time, and an availability of an interpreter having at least one language interpretation to schedule an interpretation service assignment from the plurality of computing devices associated with the at least one service recipient;
      receive authorization of a video interpretation service assignment from the plurality of computing devices associated with the at least one insurance carrier;
      responsive to receiving the authorization of the video interpretation service assignment, schedule the interpretation service assignment based on the requested date, time, and the availability of the interpreter;
      determine whether to activate a telecommunication connection for the interpretation service assignment between the plurality of the computing devices associated with the interpreter and service recipient based on the requested date, time, and the availability of the interpreter; and
      responsive to determining that the telecommunication connection is activated, establish the telecommunication connection for the interpretation service assignment between the plurality of the computing devices associated with the interpreter and service recipient by way of the scheduler and telecommunication provider server.

2. The scheduler and telecommunication system as defined in claim 1, wherein the scheduler and telecommunication provider manager has instructions that include the logic of:
   send confirmation of the scheduled interpretation service and details of an interpreter assigned to the interpretation service assignment.

3. The scheduler and telecommunication system as defined in claim 1, wherein the request includes claims number, insured information, interpreter, location, and venue.

4. The scheduler and telecommunication system as defined in claim 1, wherein the scheduler and telecommunication provider manager has instructions that include the logic of:
   responsive to not receiving the authorization of the video interpretation service assignment, send an alternate schedule for the video interpretation service assignment based on the requested date, time, and the availability of the interpreter.

5. The scheduler and telecommunication system as defined in claim 1, wherein the scheduler and telecommunication provider manager has instructions that include the logic of:
   responsive to not receiving the authorization of the video interpretation service assignment, send a rejection message rejecting the schedule for the video interpretation service assignment based on the requested date, time, and the availability of the interpreter.

6. The scheduler and telecommunication system as defined in claim 1, wherein the scheduler and telecommunication provider manager has instructions that include the logic of:
assessing a network connection quality between the scheduling and telecommunication provider server and the computing device associated with the interpreter; and
establishing the telecommunication connection between the plurality of the computing devices associated with the interpreter and service recipient is further based on the assessment of the network connection quality between the scheduling and telecommunication provider server and the computing device associated with the interpreter.

7. The scheduler and telecommunication system as defined in claim 2, wherein the network connection quality is based on at least one of the following: internet connection speed and/or bandwidth quality (Mbps) between the computing device associated with the interpreter and an internet provider, and the distance between the computing device associated with the interpreter and a node of an internet provider.

8. The scheduler and telecommunication system as defined in claim 2, wherein the scheduler and telecommunication provider manager has instructions that include the logic of assessing the connection quality between the scheduling and telecommunication provider server and the computing device associated with the service recipient.

9. The scheduler and telecommunication system as defined in claim 4, wherein the logic of establishing the telecommunication connection between the plurality of the computing devices associated with the interpreter and the service recipient is further based on the assessment of the network connection quality between the scheduler and telecommunication server and the computing device associated with the service recipient.

10. The scheduler and telecommunication system as defined in claim 2, wherein the scheduler and telecommunication provider manager has instructions that further include the logic of providing a list of interpreters based on the assessment of the network connection quality between the scheduling and telecommunication provider server and the computing device associated with the interpreter.

11. The scheduler and telecommunication system as defined in claim 1, wherein the telecommunication connection includes a voice and/or a video telecommunication connection.

* * * * *